United States Patent
Das et al.

(10) Patent No.: US 11,775,694 B2
(45) Date of Patent: Oct. 3, 2023

(54) VALIDATING AND SECURING NON-VOLATILE MEMORY

(71) Applicant: International Business Machines Corporation, Armonk, NY (US)

(72) Inventors: Raja Das, Bengaluru (IN); Sandeep Korrapati, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 17/647,026

(22) Filed: Jan. 5, 2022

(65) Prior Publication Data

US 2023/0214537 A1    Jul. 6, 2023

(51) Int. Cl.
*G06F 21/79* (2013.01)
*G06F 12/14* (2006.01)
*G06F 21/56* (2013.01)
*G06F 12/04* (2006.01)

(52) U.S. Cl.
CPC .............. *G06F 21/79* (2013.01); *G06F 12/04* (2013.01); *G06F 21/566* (2013.01); *G06F 2212/1052* (2013.01); *G06F 2212/2022* (2013.01); *G06F 2221/034* (2013.01)

(58) Field of Classification Search
CPC ........ G06F 21/79; G06F 21/566; G06F 12/14; G06F 2212/1052; G06F 2212/2022; G06F 2221/034
See application file for complete search history.

(56) References Cited

U.S. PATENT DOCUMENTS

| | | |
|---|---|---|
| 2015/0052616 A1 | 2/2015 | Hutchison |
| 2016/0026799 A1 | 1/2016 | Hershman |
| 2020/0293662 A1 | 9/2020 | Gupta |
| 2020/0380135 A1* | 12/2020 | Tateyama .............. G06F 9/4401 |
| 2021/0232690 A1* | 7/2021 | Nomura ................ H04L 9/3247 |

FOREIGN PATENT DOCUMENTS

| | | | |
|---|---|---|---|
| CN | 106997438 A * | 8/2017 | ............. G06F 21/57 |
| WO | 2017108192 A1 | 6/2017 | |

* cited by examiner

*Primary Examiner* — Matthew T Henning
(74) *Attorney, Agent, or Firm* — Stephen R. Yoder

(57) ABSTRACT

Validating code that is stored in non-volatile memory. In some instances, code that is written and/or processed by an outside entity that is brought into a local non-volatile memory setting can potentially compromise a given computer system. In order to ensure that this type of code is secure, there are methods to generate interrupt signals that can later be overridden by Otprom code in order to properly validate this outside code.

18 Claims, 3 Drawing Sheets

VALIDATING AND SECURING NON-VOLATILE MEMORY

BACKGROUND

The present invention generally relates to the field of computer memory, and more specifically to processing certain types of code that is stored in non-volatile memory.

The Wikipedia entry for "Non-volatile memory" (as of Dec. 5, 2021) states as follows: "Non-volatile memory (NVM) or non-volatile storage is a type of computer memory that can retain stored information even after power is removed. In contrast, volatile memory needs constant power in order to retain data. Non-volatile memory typically refers to storage in semiconductor memory chips, which store data in floating-gate memory cells consisting of floating-gate MOSFETs (metal-oxide-semiconductor field-effect transistors), including flash memory storage such as NAND flash and solid-state drives (SSD). Other examples of non-volatile memory include read-only memory (ROM), EPROM (erasable programmable ROM) and EEPROM (electrically erasable programmable ROM), ferroelectric RAM, most types of Computer data storage devices . . . and early computer storage methods . . . ."

SUMMARY

According to an aspect of the present invention, there is a method, computer program product and/or system that performs the following operations (not necessarily in the following order): (i) receiving a set of Seeprom code, with the Seeprom code including information for performing a first operation; (ii) determining that the set of Seeprom code was written by an outside entity via a support interface (SI) path; (iii) responsive to the determination, generating an interrupt code to prevent the set of Seeprom code from running; and (iv) overriding the interrupt code via an Otprom code path, with the Otprom code path having a secure validation code that can validate content of the set of Seeprom code.

DETAILED DESCRIPTION

Figure 1:
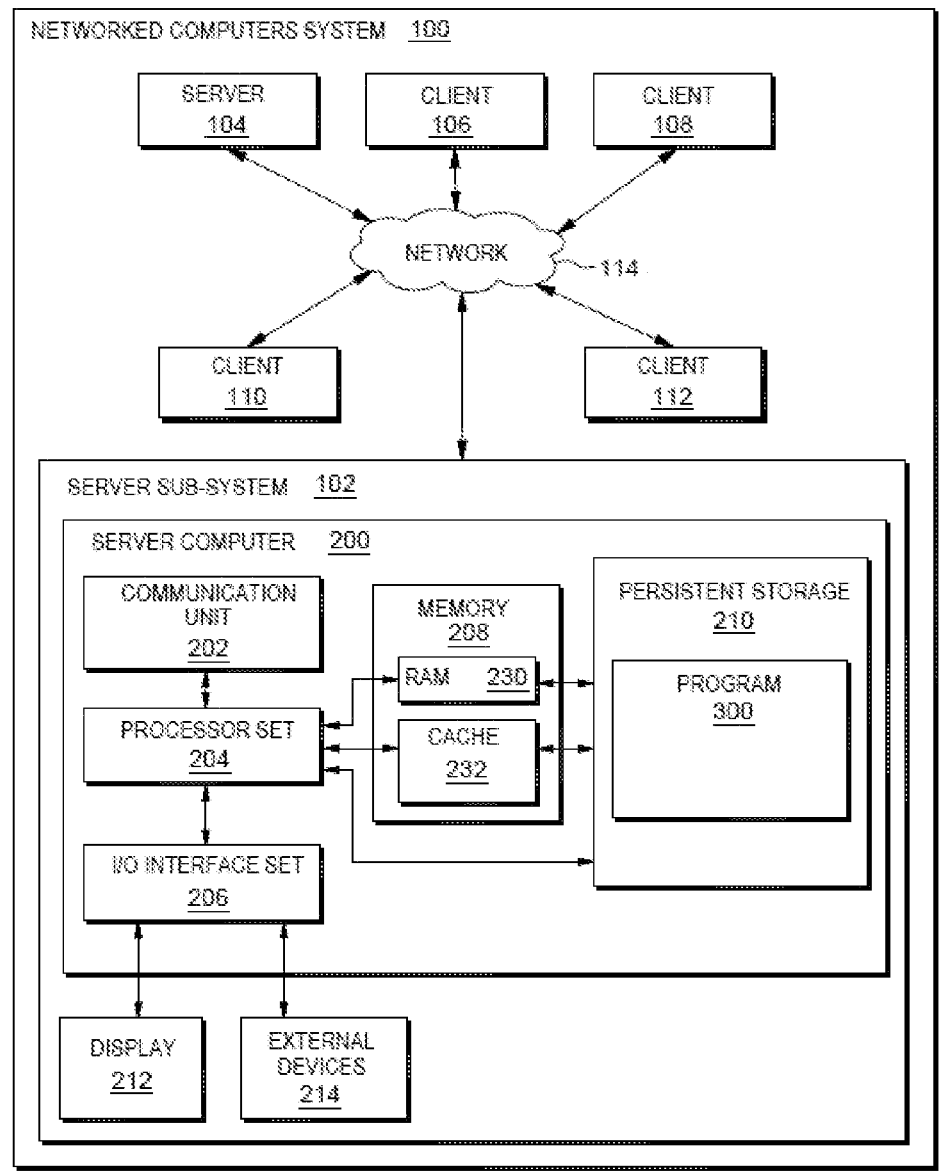
FIG. 1 is a block diagram view of a first embodiment of a system according to the present invention.

Some embodiments of the present invention are directed towards validating code that is stored in non-volatile memory. In some instances, code that is written and/or processed by an outside entity that is brought into a local non-volatile memory setting can potentially compromise a given computer system. In order to ensure that this type of code is secure, there are methods to generate interrupt signals that can later be overridden by Otprom code in order to properly validate this outside code.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
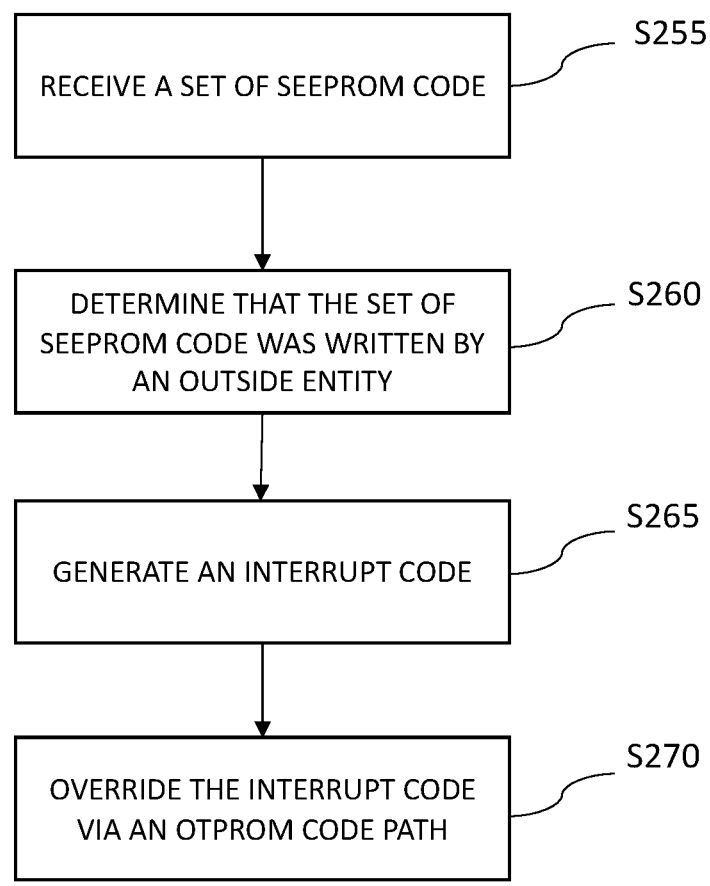
FIG. 2 is a flowchart showing a first embodiment method performed, at least in part, by the first embodiment system.
Figure 3:
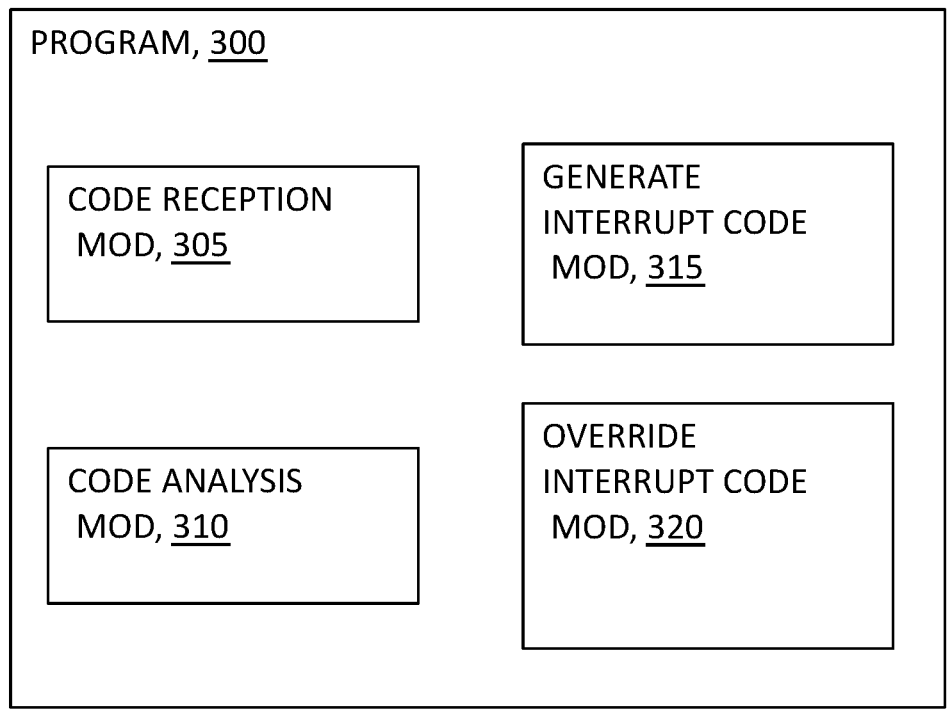
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where code reception module ("mod") 305 receives a set of code. In some embodiments of the present invention, this set of code is Seeprom code. Additionally, in some embodiments, the Seeprom code is used to execute functions of a given system. For example, this code can be used to regulate functions in memory, such as directing certain blocks of data to and from cache and/or making an ultimate decision with respect to maintaining certain blocks of data.

Processing proceeds to operation S260, where code analysis mod 310 determines that the Seeprom code (received above in connection with operation S255) was written by an outside entity. In some embodiments, the inference of the code being written by an outside entity is that the code is automatically presumed to be unsecure (that is, the code is not considered to be validated). This is to ensure that the code can be deployed safely and securely. If this was not the case, then the Seeprom code would not need to be validated in order to be properly executed by the system.

Processing proceeds to operation S265, where generate interrupt code mod 315 generates an interrupt code after determining that the Seeprom code has not been validated. In some embodiments, this interrupt code prevents the Seeprom code from running and executing any of its functions. The generation of the interrupt code is the mechanism used by embodiments of the present invention to ensure that any unvalidated code will not corrupt any stored data in memory and/or otherwise harm any memory-based systems. In some embodiments of the present invention, a new interrupt code will be generated any time the Seeprom code (or other unvalidated code or yet-to-be validated code) is updated. This further ensures that the system is protected by continually vetting and monitoring any changes that were not initially validated.

Processing finally proceeds to operation S270, where override interrupt code mod 320 generates an override code in order to stop the function of the interrupt code. In some embodiments, override interrupt code mod 320 creates this override code through an Otprom code path. This effectively ensures that the Seeprom code can be run safely. By stopping the function of the interrupt code and allowing the Seeprom code to run on the system, the Seeprom code is considered to be secure, and consequently becomes validated code.

III. Further Comments and/or Embodiments

Some embodiments of the present invention deal with a server system architecture. This architecture typically has a controller (which is a Self-Boot Engine (SBE)) that is supported by a one time programmable memory (referred to herein as Otprom), serial EEPROM (referred to herein as Seeprom), and random access memory (RAM).

In some embodiments, there are methods that allow Otprom to start executing from a specific address when a user resets the SBE. It can access the Seeprom via the SPI or I2C Interface. Once the Otprom completes execution, it jumps on to the Seeprom, which has the Loader code, and can copy the required code section into RAM and start the overall system during a Power on Reset (POR) operation.

In some embodiments, the SPI/I2C (Seeprom) is accessible via the support interface (SI) (outside the core) as well as the IB (inside bus) Path. In some cases, the Seeprom can be written into without the controller's intervention.

In some embodiments of the present invention, the controller and/or server system architecture (which is essentially the SBE) allows a user to start from any memory. In some instances, this memory can be an Otprom, Seepromor, and/or RAM. If a user updates the Seeprom and bypasses the Otprom, it is possible to run anything on the SBE.

Embodiments of the present invention make use of the Otprom memory because this type of memory is a "one time programmable" in order to ensure a secure and reliable chain of trust.

In one use case, it can be assumed that an external entity has updated the Seeprom code by writing it from the outside via the SI path when the security is down. Alternatively, it can be assumed that the SBE is powered on but the execution is not triggered (which is one way in which the SBE is handled). Whenever any user uses the SPI/I2C path to write to Seeprom, it will generate an interrupt handling in the SBE not to execute any code that is running out of the Seeprom memory.

In essence, through this process, the SPI path from the SBE side will get blocked, and therefore no read operations on the Seeprom can be performed. The only way to enable these operations is to go through the Otprom code path to reset the interrupt signal.

In some embodiments of the present invention, Otprom is used because the lower level hardware has an address check which enables only an Otprom address to execute the signal reset. Therefore, no external entity will be able to shut off or modify the reset signal. This way, embodiments of the present invention ensure that Otprom gets the execution path whenever Seeprom is written into.

In some embodiments, Otprom code will have a validation code that can ensure that Seeprom memory contents are valid throughout. Even if an unauthorized user gets to update the Seeprom, it will not be able to execute the same.

Embodiments of the present invention provide a method to trigger the "read_lock_latch" basis of the "wr" signal from the SPI controller. Any write operation that is performed to the Seeprom, either from the internal SPI or external SPI, will enable the read lock protection on the Seeprom. This "read_lock" signal will get cleared if the chip is reset via the reset logic of the chip so that first block of code in the reset path (Otprom) can validate the Seeprom content every time before any execution happens from that path.

In some embodiments, the Otprom will have a validation code that will validate the Seeprom code. Anytime Seeprom is updated, the Otprom gets to execute the validation flow every time. Without execution of the Otprom validation code, the user will never be able to execute the Seeprom content, even if he or she has updated it somehow. This is because the SBE will hold a reset signal that will block any read operation to the Seeprom via SPI or I2C.

Once the validation is successful, it means that code which is in Seeprom is secure and can be trusted to execute other workloads.

Embodiments of the present invention recognize the following facts, features, characteristics and/or advantages: (i) in current models where a processor has no write access to SEEPROM modules, only internal recovery is possible, and updates and/or patches have to go through a Boot Engine in a secure exchange way; (ii) with the use of some embodiments of the present invention, an SP processor can also recover a system in a lab bring up or even in field, if the boot images are corrupted to an extent that they are not recoverable internally; (iii) this avoids overhead in lab bring up where users currently have to send failed modules from the system back to the test floor for re-flashing SEEPROMs; (iv) avoids de-configuring a chip permanently; (v) allows an external/internal untrusted entity (like SP) capable of updating Boot images even on a secure system; (vi) hardware mechanism blocks read operations to SEEPROM from the Boot engine once SEEPROM is updated by an untrusted entity (internal/external); and (vii) reads lock to be cleared on the next system reset.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices

What is claimed is:

1. A computer-implemented method (CIM) comprising:
receiving a set of Seeprom code, with the Seeprom code including information for performing a first operation;
determining that the set of Seeprom code was written by an outside entity via a support interface (SI) path;
responsive to the determination, generating an interrupt code to prevent the set of Seeprom code from running; and
overriding the interrupt code via an Otprom code path, with the Otprom code path having a secure validation code that can validate content of the set of Seeprom code.

2. The CIM of claim 1 further comprising:
responsive to the overriding of the interrupt code via an Otprom code path, executing the Seeprom code.

3. The CIM of claim 1 further comprising:
determining that the set of Seeprom code has been updated by an outside entity via the SI path;
responsive to the determination, generating a second interrupt code to prevent the updated set of Seeprom code from running;
overriding the second interrupt code via the Otprom code path, with the Otprom code path having a secure validation code that can validate the content of the updated set of Seeprom code.

4. The CIM of claim 1 wherein the interrupt code is generated based, at least in part, upon a determination that a write operation is attempted from an internal Serial Peripheral Interface (SPI).

5. The CIM of claim 1 wherein the interrupt code is generated based, at least in part, upon a determination that a write operation is attempted from an external Serial Peripheral Interface (SPI).

6. The CIM of claim 1 wherein a first block of code in the Otprom code path is used to validate any Seeprom code that is executed via the Otprom code path.

7. A computer program product (CPP) comprising:
a machine readable storage device; and
computer code stored on the machine readable storage device, with the computer code including instructions and data for causing a processor(s) set to perform operations including the following:
receiving a set of Seeprom code, with the Seeprom code including information for performing a first operation,
determining that the set of Seeprom code was written by an outside entity via a support interface (SI) path,
responsive to the determination, generating an interrupt code to prevent the set of Seeprom code from running, and
overriding the interrupt code via an Otprom code path, with the Otprom code path having a secure validation code that can validate content of the set of Seeprom code.

8. The CPP of claim 7 further comprising:
responsive to the overriding of the interrupt code via an Otprom code path, executing the Seeprom code.

9. The CPP of claim 7 further comprising:
determining that the set of Seeprom code has been updated by an outside entity via the SI path;
responsive to the determination, generating a second interrupt code to prevent the updated set of Seeprom code from running;
overriding the second interrupt code via the Otprom code path, with the Otprom code path having a secure validation code that can validate the content of the updated set of Seeprom code.

10. The CPP of claim 7 wherein the interrupt code is generated based, at least in part, upon a determination that a write operation is attempted from an internal Serial Peripheral Interface (SPI).

11. The CPP of claim 7 wherein the interrupt code is generated based, at least in part, upon a determination that a write operation is attempted from an external Serial Peripheral Interface (SPI).

12. The CPP of claim 7 wherein a first block of code in the Otprom code path is used to validate any Seeprom code that is executed via the Otprom code path.

13. A computer system (CS) comprising:
a processor(s) set;
a machine readable storage device; and
computer code stored on the machine readable storage device, with the computer code including instructions and data for causing the processor(s) set to perform operations including the following:
receiving a set of Seeprom code, with the Seeprom code including information for performing a first operation,
determining that the set of Seeprom code was written by an outside entity via a support interface (SI) path,
responsive to the determination, generating an interrupt code to prevent the set of Seeprom code from running, and
overriding the interrupt code via an Otprom code path, with the Otprom code path having a secure validation code that can validate content of the set of Seeprom code.

14. The CS of claim 13 further comprising:
responsive to the overriding of the interrupt code via an Otprom code path, executing the Seeprom code.

15. The CS of claim 13 further comprising:
determining that the set of Seeprom code has been updated by an outside entity via the SI path;
responsive to the determination, generating a second interrupt code to prevent the updated set of Seeprom code from running;
overriding the second interrupt code via the Otprom code path, with the Otprom code path having a secure validation code that can validate the content of the updated set of Seeprom code.

16. The CS of claim 13 wherein the interrupt code is generated based, at least in part, upon a determination that a write operation is attempted from an internal Serial Peripheral Interface (SPI).

17. The CS of claim 13 wherein the interrupt code is generated based, at least in part, upon a determination that a write operation is attempted from an external Serial Peripheral Interface (SPI).

18. The CS of claim 13 wherein a first block of code in the Otprom code path is used to validate any Seeprom code that is executed via the Otprom code path.

* * * * *